United States Patent
Kim et al.

(10) Patent No.: US 10,093,306 B2
(45) Date of Patent: Oct. 9, 2018

(54) SYSTEM AND METHOD OF STABILIZING COMBUSTION OF HYBRID ELECTRIC VEHICLE

(71) Applicant: HYUNDAI MOTOR COMPANY, Seoul (KR)

(72) Inventors: Yong Seok Kim, Seoul (KR); Sanghoon Lee, Gunpo-si (KR); Sang Eun Bae, Seoul (KR); Jeong Ki Huh, Yongin-si (KR)

(73) Assignee: Hyundai Motor Company (KR)

( * ) Notice: Subject to any disclaimer, the term of this patent is extended or adjusted under 35 U.S.C. 154(b) by 0 days.

(21) Appl. No.: 15/364,539

(22) Filed: Nov. 30, 2016

(65) Prior Publication Data

US 2017/0151941 A1    Jun. 1, 2017

(30) Foreign Application Priority Data

Nov. 30, 2015    (KR) .................. 10-2015-0168975

(51) Int. Cl.
| | |
|---|---|
| B60W 20/16 | (2016.01) |
| F01N 3/10 | (2006.01) |
| F01N 11/00 | (2006.01) |
| F02M 26/15 | (2016.01) |
| B60W 10/06 | (2006.01) |
| B60W 10/02 | (2006.01) |
| F02D 41/00 | (2006.01) |
| F02D 41/06 | (2006.01) |
| F02D 41/04 | (2006.01) |
| F02N 11/04 | (2006.01) |

(52) U.S. Cl.
CPC ............ *B60W 20/16* (2016.01); *B60W 10/02* (2013.01); *B60W 10/06* (2013.01); *F01N 3/10* (2013.01); *F01N 11/002* (2013.01); *F02D 41/0065* (2013.01); *F02D 41/062* (2013.01); *F02M 26/15* (2016.02); *B60Y 2200/92* (2013.01); *B60Y 2300/47* (2013.01); *F01N 2610/03* (2013.01); *F02D 41/0055* (2013.01); *F02D 41/042* (2013.01); *F02D 2250/36* (2013.01); *F02N 11/04* (2013.01); *Y02T 10/47* (2013.01); *Y10S 903/93* (2013.01)

(58) Field of Classification Search
CPC ............................ B60W 20/16; B60W 10/02
See application file for complete search history.

(56) References Cited

U.S. PATENT DOCUMENTS

2015/0158378 A1*    6/2015    Dudar .................... B60K 15/03 701/22

FOREIGN PATENT DOCUMENTS

JP    2002-256919 A    9/2002

\* cited by examiner

*Primary Examiner* — Derek Douglas Knight
(74) *Attorney, Agent, or Firm* — McDonnell Boehnen Hulbert & Berghoff LLP

(57) ABSTRACT

A system and method of stabilizing combustion in the engine of a hybrid electric vehicle. The system includes a controller controlling a starter and an injector, wherein the controller causes the starter to rotate the engine without fuel injection before starting the engine after an engine starting condition is satisfied or after an engine stop condition is satisfied and the engine is stopped.

17 Claims, 6 Drawing Sheets

SYSTEM AND METHOD OF STABILIZING COMBUSTION OF HYBRID ELECTRIC VEHICLE

CROSS-REFERENCE TO RELATED APPLICATION

This application claims priority to and the benefit of Korean Patent Application No. 10-2015-0168975 filed in the Korean Intellectual Property Office on Nov. 30, 2015, the entire contents of which are incorporated herein by reference.

BACKGROUND OF THE INVENTION (a) Field of the Invention

The present invention relates to a system and method of stabilizing combustion in a hybrid electric vehicle. More particularly, the present invention relates to a system and method of stabilizing combustion in a hybrid electric vehicle that reduces emission of noxious gases by discharging an exhaust gas remaining in an exhaust gas recirculation line during starting or stopping the vehicle engine.

(b) Description of the Related Art

Typical vehicles convert energy generated by burning fossil fuel into kinetic energy and run by expending the kinetic energy. An exhaust gas generated by burning the fossil fuel is discharged to the atmosphere through a tail pipe after the exhaust gas is processed to remove noxious materials. Vehicle exhaust systems may include a catalytic converter for processing noxious materials contained in the exhaust gas.

Recently, environmentally-friendly vehicles such as electric vehicles and hybrid electric vehicles have been developed and used due to depletion of fossil fuels and environmental pollution caused by fossil fuel vehicles. In addition, new catalysts have been developed for use in processing noxious materials contained in the exhaust gas.

Hybrid electric vehicles typically use an engine and a motor/generator as power sources. The hybrid electric vehicles use the motor/generator, which has better low-speed torque characteristics, as a primary power source at low speeds, and use the engine, which has better high-speed torque characteristics, as a primary power source at high speeds. Because hybrid electric vehicles use a motor/generator rather than the fossil fuel burning engine at low speeds, they consume less fuel and produce less exhaust gas.

The vehicles may also contain an exhaust gas recirculation ("EGR") module to reduce production of nitrogen oxides and improve fuel economy by lowering the combustion temperature and for reducing production of nitrogen oxides. The EGR module is mounted on a recirculation pipe fluidly connecting an exhaust pipe with an intake manifold or an intake duct and recirculates a portion of the exhaust gas back into the intake manifold or the intake duct to lower maximum temperature during combustion.

The EGR module operates in a predetermined engine operation region. When the EGR module is not operating, some exhaust gas can leak through a gap between the EGR module and the recirculation pipe. When the engine is running, the leaked exhaust gas is directly supplied into a combustion chamber. Because the amount of leaked exhaust gas is very small, however, combustion is little affected by the exhaust gas leaking into the combustion chamber.

If the engine is not operated for a long time, however, the leaked exhaust gas collects in the recirculation pipe between the exhaust gas recirculation module and an intake system (intake manifold or intake duct). The leaked exhaust gas gathered in the recirculation pipe (hereinafter referred to as 'residual gas') is supplied into the combustion chamber when the engine is started, which causes unstable combustion and increases the production of noxious materials in the exhaust gas. Particularly, because the catalyst in the catalytic converter cannot reach its activation temperature when the engine is started after a protracted period of downtime, the catalytic converter cannot effectively process the noxious materials in the residual gas and they are discharged to the exterior of the vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present disclosure provides a system and method of stabilizing combustion in a hybrid electric vehicle having the advantages of discharging a residual exhaust gas remaining in an exhaust gas recirculation line during starting an engine or stopping the engine.

In an example embodiment, a system of stabilizing combustion in a hybrid electric vehicle comprises: an engine having a combustion chamber; an intake manifold; an exhaust manifold; an injector that supplies fuel into the intake manifold or the combustion chamber; a starter connected to the engine and capable of rotating the engine whether or not fuel is supplied; an intake duct connected to the intake manifold that supplies air to the intake manifold; an exhaust pipe connected to the exhaust manifold that discharges an exhaust gas to an exterior of the engine; a recirculation pipe fluidly that connects the exhaust pipe with the intake manifold or the intake duct and recirculates a portion of the exhaust gas to the intake manifold or the intake duct; an exhaust gas recirculation ("EGR") module that controls the amount of the exhaust gas recirculated to the intake manifold or the intake duct; and a controller that monitors a vehicle operation state and controls operation of the starter and the injector. In this example embodiment, if the controller determines that an engine starting condition is satisfied, the controller causes the starter to rotate the engine without fuel injection before starting the engine. If the controller determines an engine stop condition is satisfied, it causes the starter to rotate the engine without fuel injection after the engine is stopped.

In a further example embodiment, the starter may control the number of rotations of the engine without fuel injection, the rotation speed of the engine without fuel injection, or the length of time the engine is rotated without fuel injection.

A throttle that controls the amount of the air supplied to the intake manifold may be mounted in the intake duct, in the intake manifold, or between the intake manifold and the intake duct. The number of engine rotations, the engine rotation speed, or the length of time the engine is rotated without fuel injection may be correlated to an opening of the throttle, or a shape of the intake duct or the intake manifold.

The vehicle may be a hybrid electric vehicle using the engine and a drive motor as power sources, whereby the power of the engine or power of the drive motor may be output through a transmission.

The system may further include a selective connecting device disposed between the engine and the transmission or in the transmission and selectively connecting the engine to the transmission.

Rotation of the engine without fuel injection may be performed when the engine is disconnected from the transmission by the selective connecting device.

A catalyst for processing the exhaust gas may be contained in a catalytic converter mounted on the exhaust pipe.

In an additional example embodiment, the controller may determine whether an idling condition is satisfied if the engine starting condition is satisfied, and may rotate the engine without fuel injection if the idling condition is satisfied, thereby purging the exhaust gas before the engine engages. The idling condition may be satisfied when temperature of the catalyst is lower than or equal to a first predetermined temperature.

In another example embodiment, the controller may further determine whether an idling condition is satisfied if the engine stop condition is satisfied, and may rotate the engine without fuel injection if the idling condition is satisfied. The idling condition may be satisfied when temperature of the catalyst is higher than or equal to a second predetermined temperature A method of stabilizing combustion according to another example embodiment of the present invention is performed in a hybrid electric vehicle having the system of stabilizing combustion.

The method may include: monitoring a vehicle operation state by the controller; determining by the controller whether an engine starting condition is satisfied; and, if the engine starting condition is satisfied, having the controller cause the starter to rotate the engine without fuel injection for a predetermined number of rotations or for a predetermined time.

Example methods may further include starting the engine by rotating the engine with fuel injection after rotating the engine without fuel injection for the predetermined number of rotations or for the predetermined time.

Example methods may further include determining whether an idling condition is satisfied if the engine starting condition is satisfied, and, if the idling condition is satisfied, having the controller cause the starter to rotate the engine without fuel injection for the predetermined number of rotations or for the predetermined time.

The idling condition may be satisfied when temperature of the catalyst is lower than or equal to a first predetermined temperature.

The method may further include connecting the engine with the transmission by the selective connecting device after starting the engine.

In another example embodiment, the method may include: monitoring a vehicle operation state by the controller when the vehicle runs with the power of the engine or with both of the power of the engine and the power of the motor; determining by the controller whether an engine stop condition is satisfied; and if the engine stop condition is satisfied, disconnecting the transmission from the engine by the selective connecting device and stopping fuel injection; and having the controller cause the starter to rotate the engine for the predetermined number of rotations or for the predetermined time.

The method may further include determining whether an idling condition is satisfied if the engine stop condition is satisfied, wherein, if the idling condition is satisfied, the engine is rotated by the starter by the predetermined numbers or for the predetermined time.

The idling condition may be satisfied when temperature of the catalyst is higher than or equal to a second predetermined temperature.

As described above, the exemplary embodiments of the present invention can stabilize combustion by discharging the exhaust gas (residual gas) remaining in the exhaust gas recirculation line before starting the engine or after stopping the engine.

In addition, the exemplary embodiments of the present invention can reduce emission of noxious gases by stabilizing combustion.

DETAILED DESCRIPTION OF THE EMBODIMENTS

Exemplary embodiments of the present invention are described in detail hereinafter with reference to the accompanying drawings.

Figure 1:
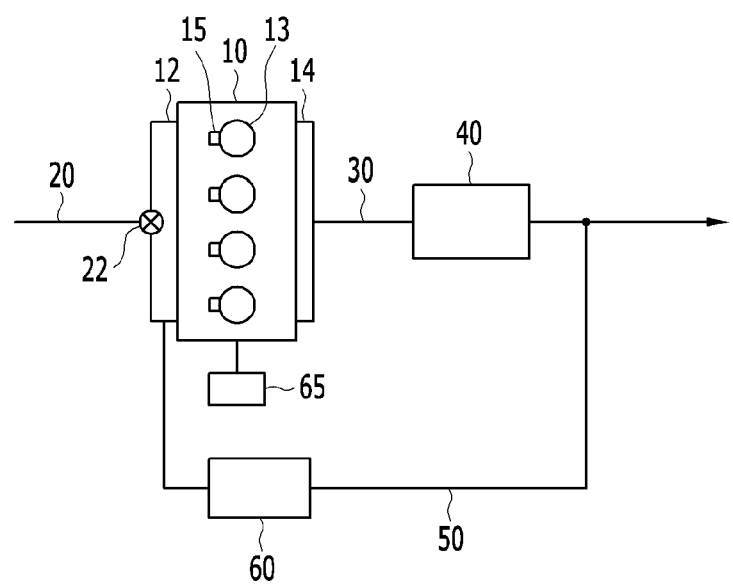
FIG. 1 is a schematic diagram of an example embodiment of a system of stabilizing combustion.

FIG. 1 is a schematic diagram of an example embodiment of a system of stabilizing combustion.

As shown in FIG. 1, a system of stabilizing combustion includes an engine 10, a catalytic converter 40 containing a catalyst and an exhaust gas recirculation ("EGR") module 60. In further example embodiments, the system of stabilizing combustion may also include an intake duct 20, an exhaust pipe 30 and a recirculation pipe 50.

Engine 10 burns an air/fuel mixture to convert chemical energy into mechanical energy. Engine 10 is connected to an intake manifold 12 that supplies air to a combustion chamber 13. Engine 10 is also connected to an exhaust manifold 14. Exhaust gas generated during combustion of the air/fuel mixture is collected in the exhaust manifold 14 and exhausted to the exterior of the vehicle. An injector 15 is mounted in combustion chamber 13 and injects the fuel directly into combustion chamber 13. The figures in this disclosure illustrate a gasoline direct injection (GDI) engine, but a multi-point injection (MPI) engine may be used. In a case of an MPI engine, injector 15 may be mounted in intake manifold 12, and specifically, in an intake port connecting the intake manifold to the combustion chamber.

Intake duct 20 is connected to intake manifold 12. A throttle 22 is mounted in intake manifold 12, or in intake duct 20, or between intake manifold 12 and intake duct 20. Throttle 22 controls the amount of the air supplied to intake manifold 12 according to an opening of the throttle 22.

Exhaust pipe 30 is connected to exhaust manifold 14 and discharges exhaust gas to the exterior of the vehicle. At least one catalytic converter 40 and/or a particulate filter is mounted on exhaust pipe 30 and removes hydrocarbons, carbon monoxide, nitrogen oxide and particulate matter contained in the exhaust gas. In example embodiments, the catalytic converter 40 uses a catalyst selected from: a three-way catalyst, a lean NOx trap ("LNT"), an oxidation catalyst, or a selective catalytic reduction ("SCR") catalyst. In further example embodiments, a muffler may be mounted on exhaust pipe 30.

Recirculation pipe 50 fluidly connects exhaust pipe 30 with intake manifold 12 or intake duct 20 and recirculates a portion of the exhaust gas to intake manifold 12 or intake duct 20. As illustrated in FIG. 1, recirculation pipe 50 may connected to the exhaust pipe 30 downstream of catalytic converter 40. However, those of skill in the art would understand that other configurations are possible that maintain the spirit of the present disclosure, e.g., recirculation pipe 50 may be connected to exhaust pipe 30 upstream of catalytic converter 40. Therefore, recirculation pipe 50 described in this specification and claims may include all pipes, ducts, or the like that fluidly communicate exhaust pipe 30 with intake manifold 12 or intake duct 20 regardless of the positions of the pipes, ducts, or the like connected to exhaust pipe 30.

EGR module 60 is mounted on recirculation pipe 50, and controls the amount of exhaust gas recirculated to intake manifold 12 or intake duct 20. Because EGR module 60 is well known to a person of an ordinary skill in the art, a detailed description thereof will be omitted.

In further example embodiments, the system of stabilizing combustion includes a starter 65. Starter 65 can rotate the engine 10 regardless of whether fuel is supplied to combustion chamber 13. If fuel is supplied to combustion chamber 13 when the starter 65 rotates the engine 10, the engine 10 is started. On the contrary, if the starter 65 rotates the engine 10 without supplying the fuel into combustion chamber 13, the engine 10 is rotated but is not started. Herein, rotation of engine 10 means rotation of a crankshaft provided in engine 10. Starter 65 controls the number of rotations or the rotation speed of engine 10.

Figure 2:
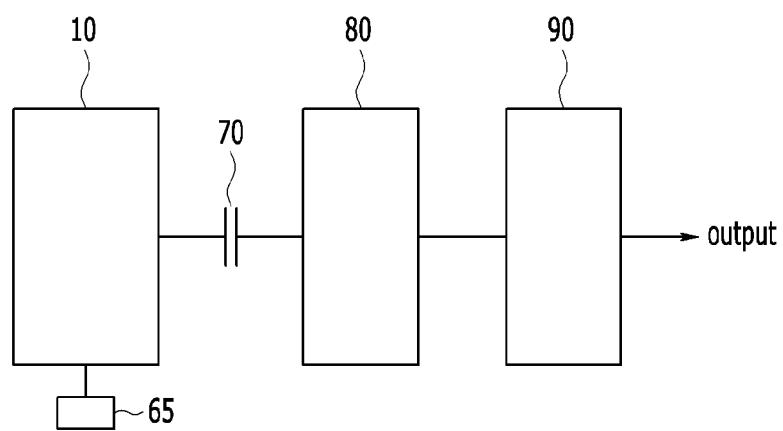
FIG. 2 is a schematic diagram of an example power transmission system in a vehicle provided with an example embodiment of a system of stabilizing combustion.
Figure 3:
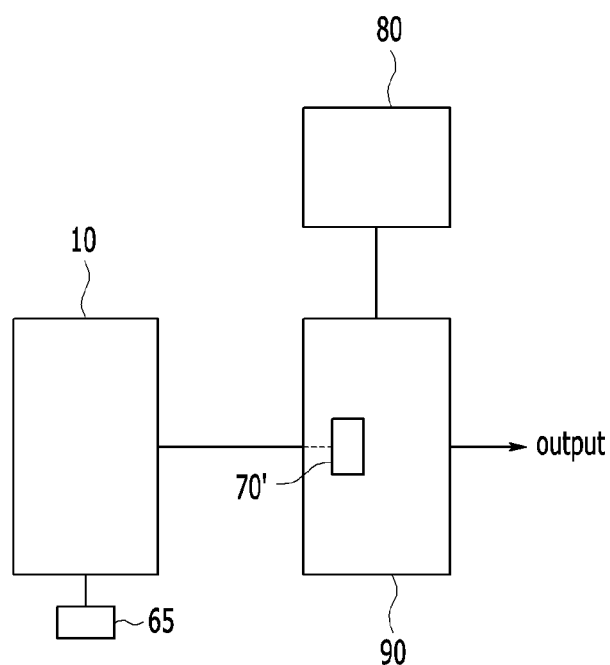
FIG. 3 is a schematic diagram of a second example of a power transmission system in a vehicle provided with an example embodiment of a system of stabilizing combustion.

FIGS. 2 and 3 are schematic diagrams of two examples of a power transmission system in a vehicle provided with an example embodiment of a system of stabilizing combustion according to the present disclosure.

The system of stabilizing combustion according to an exemplary embodiment of the present disclosure can be used in a vehicle having EGR module 60 and engine 10. FIG. 2 and FIG. 3 illustrate a power transmission system for a hybrid electric vehicle using an example embodiment of the disclosed system of stabilizing combustion. However, the system of stabilizing combustion can also be used in a fossil fuel-burning vehicle as well as in a hybrid electric vehicle.

The power transmission system of the hybrid electric vehicle illustrated in FIG. 2 includes engine 10, a drive motor 80 and a transmission 90 sequentially connected with each other.

Drive motor 80 is directly connected to transmission 90 and provides power to a vehicle in electric vehicle ("EV") mode or hybrid electric vehicle ("HEV") mode. A hybrid car can be operated by only an electric motor (not fossil fuel) in "EV" mode, and by both the electric motor and an engine in "HEV" mode.

Engine 10 is connected to transmission 90 by drive motor 80. An engine clutch 70 is disposed between and selectively connects engine 10 and drive motor 80 (with the transmission 90).

Transmission 90 transmits power generated by engine 10 or power generated by drive motor 80 with or without power conversion. When a vehicle operates in HEV, the power ration of the motor and the engine can be altered.

The power transmission system of the hybrid electric vehicle illustrated in FIG. 3 includes engine 10 and drive motor 80 independently (i.e. non-sequentially) connected with transmission 90.

Drive motor 80 is directly connected to transmission 90 and outputs power at EV mode or HEV mode.

Engine 10 is selectively connected with transmission 90 through a selective connecting device 70'. Selective connecting device 70' may be positioned in transmission 90. Selective connecting device 70' may be a planetary gear set or epicyclic train and frictional elements for controlling engagement and disengagement of the rotational element of the planetary gear set or epicyclic train.

FIG. 2 and FIG. 3 are intended only to be examples of hybrid electric vehicle power transmission systems using an example embodiment of system of stabilizing combustion. Example embodiments of the system of stabilizing combustion according to the present disclosure may be applied to other hybrid electric vehicle power transmission systems or to power transmission systems in fossil-fuel burning vehicles.

Figure 4:
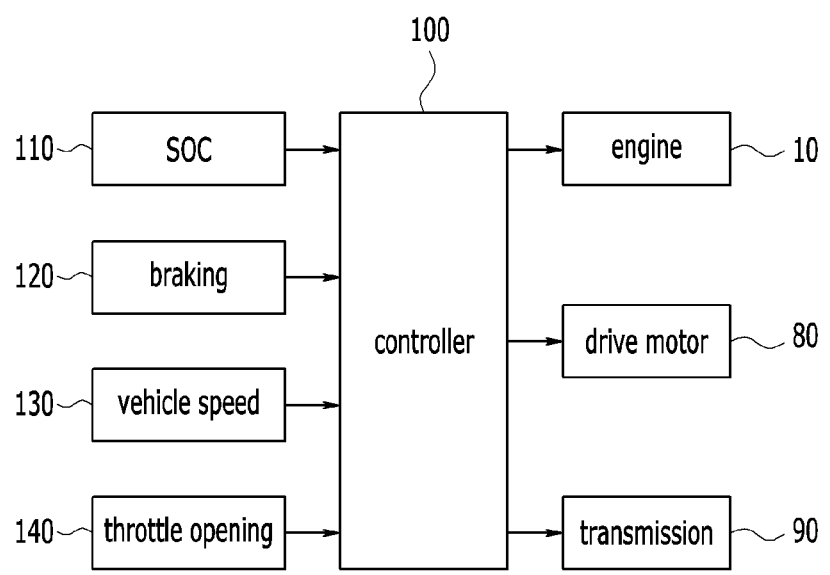
FIG. 4 is a block diagram showing inputs and outputs of a controller in an example embodiment of a system of stabilizing combustion.

FIG. 4 is a block diagram showing inputs and outputs of a controller in an example embodiment of a system of stabilizing combustion.

As shown in FIG. 4, the system of stabilizing combustion further includes a controller 100. Controller 100 controls engine 10, drive motor 80 and transmission 90 based on input signals 110, 120 130, and 140.

In further detail, controller 100 receives at least one of: an input signal 110 corresponding to the state of charge ("SOC") of a battery, an input signal 120 corresponding to braking of the vehicle, an input signal 130 corresponding to a vehicle speed, and an input signal 140 corresponding to opening of a throttle. Controller 100 determines the operation mode of the vehicle (e.g., engine mode, EV mode, HEV mode, etc.), calculates power demand, and distributes power to engine 10 and drive motor 80 based on the input variables. Specifically, controller 100 calculates a target power for engine 10 and a target power for drive motor 80. If the target power for engine 10 is positive in a state where the engine 10 is not started, controller 100 starts engine 10. That is, the fuel is injected into combustion chamber 15 by injector 15 and starter 65 causes engine 10 to rotate. In addition, controller 100 determines a gear ratio for transmission 90.

If the target power of the engine 10, the target power of the drive motor 80, and the gear ratio of the transmission 90 is calculated or determined, controller 100 may control operation of the engine 10, the drive motor 80, and the transmission 90. That is, the controller 100 controls the starter 65 and the injector 15 to rotate the engine 10 with or without fuel injection, controls the injector 15 to control fuel injection amount and/or fuel injection timing, controls the selective connecting device 70 or 70' to connect or disconnect the engine 10 to or from the transmission 90, and controls the transmission 90 to achieve the target gear ratio.

In further example embodiments, controller 70 comprises one or more processors executing a predetermined program that performs each step of an example method of stabilizing combustion.

FIG. 4 illustrates an example embodiment using the minimum number of input signals. Input signals other than the input variables illustrated in FIG. 4 also can be used to control the hybrid electric vehicle; for example engine control, shift control, motor control, SOC management of battery, etc.

Figure 5:
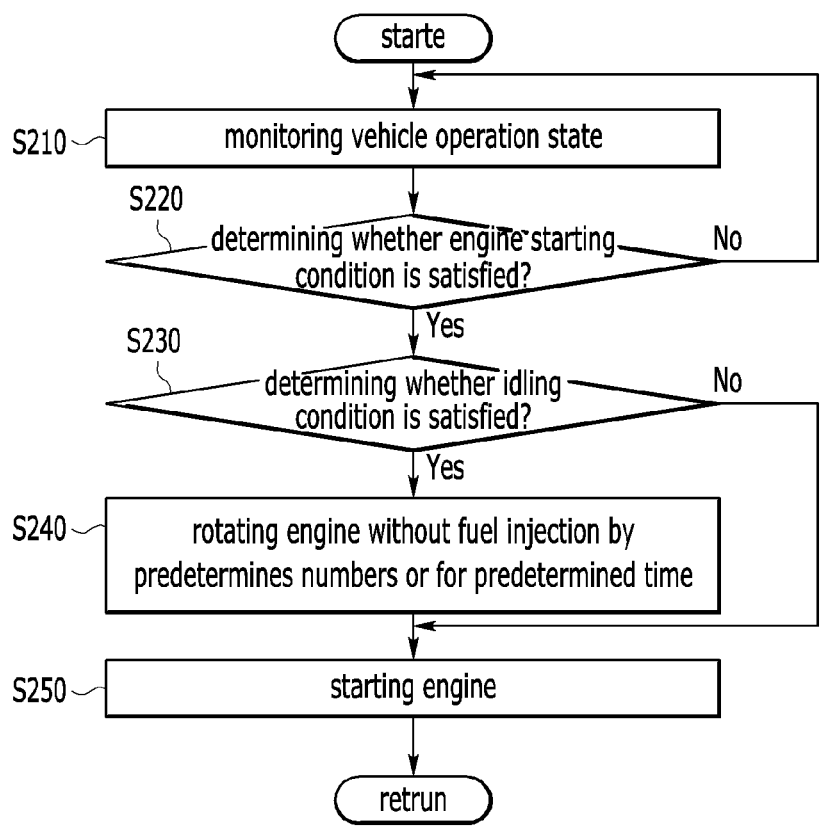
FIG. 5 is a flowchart of an example embodiment of a method of stabilizing combustion in a hybrid electric vehicle.

FIG. 5 is a flowchart of another example embodiment of a method of stabilizing combustion according to the present disclosure, illustrating the steps of a method of stabilizing combustion when the engine 10 is started.

As shown in FIG. 5, the example method of stabilizing combustion in a hybrid electric vehicle begins with monitoring a vehicle operation state in step S210. The vehicle operation state may include at least one of: the SOC of battery 110, braking status 120, vehicle speed 130, or throttle opening 140. Alternatively, the vehicle operation state may include the position of an accelerator pedal.

Controller 100 determines whether the vehicle operation state satisfies an engine starting condition in step S220. For example, if battery charge is necessary or the power of the engine for driving the vehicle is necessary, it is the engine starting condition is satisfied. Because various engine starting conditions are well known to a person of an ordinary skill in the art, detailed descriptions thereof are omitted herein.

If the engine starting condition is not satisfied in step S220, controller 100 continues to monitor the vehicle operation state in step S210.

If the engine starting condition is satisfied in step S220, controller 100 determines whether an idling condition is satisfied in step S230. The idling condition may be satisfied, for example, when the temperature of the catalyst in catalytic converter 40 is lower than or equal to a first predetermined temperature, but is not limited thereto. The first predetermined temperature relates to an activation temperature of the catalyst in catalytic converter 40 and varies according to the type of the catalyst used in catalytic converter 40. The temperature of the catalyst in catalytic converter 40 may be detected by a sensor or may be calculated from an ambient temperature, an intake temperature and/or a coolant temperature.

If the exhaust gas remaining in recirculation pipe 50 (residual gas) is supplied to combustion chamber 13 when engine 10 is started, combustion may be unstable, thereby increasing the amount of noxious materials in the exhaust gas.

If the temperature of the catalyst in catalytic converter 40 is higher than the first predetermined temperature (i.e., the idling condition is not satisfied), the noxious materials in the exhaust gas can be purified in catalytic converter 40. Therefore, if the idling condition is not satisfied, controller 100 does not cause starter 65 to rotate engine 10 without fuel injection to forcibly discharge the residual gas, but starts engine 10 in step S250. That is, injector 15 injects the fuel and starter 65 rotates engine 10.

However, if the temperature of the catalyst in catalytic converter 40 is lower than or equal to the first predetermined temperature (i.e., the idling condition is satisfied), the noxious materials in the exhaust gas cannot be purified in the catalytic converter 40. Therefore, if the idling condition is satisfied, in step S240 controller 100 rotates engine 10 without fuel injection for a predetermined number of rotations or for a predetermined time so as to forcibly discharge the residual gas to the exterior of the combustion chamber 13. Herein, the predetermined number of rotations or the predetermined time is selected to be sufficient to forcibly discharge residual gas. If engine 10 is rotated without fuel injection the predetermined number of rotations or for the predetermined time, the residual gas is forcibly sucked into combustion chamber 13 and is forcibly discharged to exhaust pipe 30 through an exhaust valve by the pressure difference between combustion chamber 13 and an intake system. In addition, the pressure difference may be altered by opening throttle 22, or the shape of intake duct 20 or intake manifold 12. Therefore, the predetermined number of rotations or the predetermined time may be determined according to the opening of the throttle 22, or the shape of the intake duct 20 or the intake manifold 12. In addition, a sufficient amount of the residual gas may be forcibly discharged by controlling the rotation speed of engine 10 by starter 65.

In addition, step S240 is executed when engine 10 is disconnected from transmission 90 by selective connecting device 70 or 70'. By disconnecting engine 10 from transmission 90, the power of the starter for rotating the engine 10 may be reduced.

Controller 100 next starts engine 10 in step S250. Fuel is injected by injector 15 and starter 65 rotates engine 10. Because the residual gas is removed in step S240, controller 100 can precisely determine an amount of air (or an amount of oxygen in the air) supplied into combustion chamber 13. Because the amount of fuel is controlled according to the amount of the air supplied into the combustion chamber 13, combustion may be stabilized. If engine 10 is started, controller 100 connects engine 10 with transmission 90 through selective connecting device 70 or 70'. Therefore, the vehicle can be driven or the battery can be charged by the power of engine 10.

Meanwhile, if the engine starting condition is satisfied in step S220, the method directly proceeds to step S240 according to a modified example embodiment. In this embodiment, the residual gas must be discharged before starting the engine.

Figure 6:
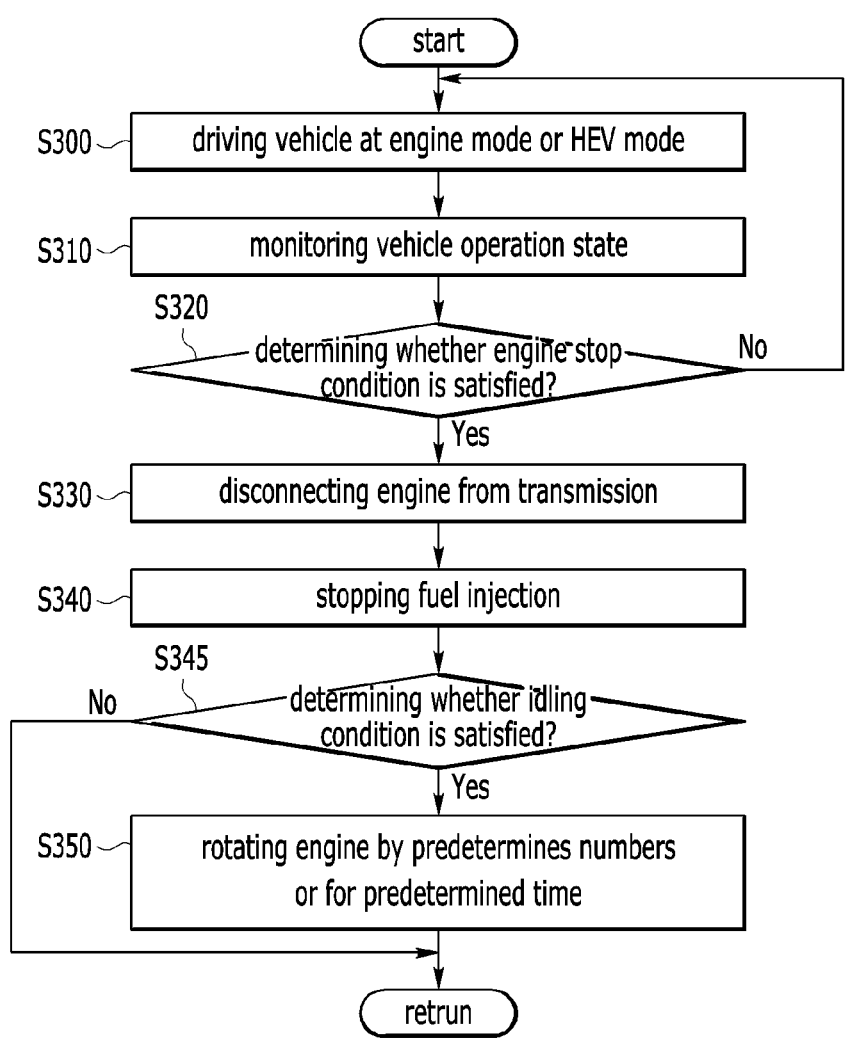
FIG. 6 is a flowchart of a second example embodiment of a method of stabilizing combustion in a hybrid electric vehicle.

FIG. 6 is a flowchart of a method of stabilizing combustion in a hybrid electric vehicle according to yet another example embodiment. FIG. 6 illustrates the steps of a method of stabilizing combustion when engine 10 is stopped.

In the embodiment shown in FIG. 6, the method of stabilizing combustion begins with driving the vehicle in the engine mode or the HEV mode in step S300; i.e. when engine 10 is running.

Controller 100 monitors the vehicle operation state in step S310 and determines whether the vehicle operation state satisfies an engine stop condition in step S320. For example, if the power of the engine is not necessary, it is determined that an engine stop condition is satisfied. Because various engine stop conditions are well known to a person of an ordinary skill in the art, a detailed description thereof is omitted herein.

If the engine stop condition is not satisfied in step S320, controller 100 returns to step S300 and continues to monitor the vehicle operation state in step S310.

If the engine stop condition is satisfied in step S320, controller 100 disconnects engine 10 from transmission 90 through selective connecting device 70 or 70' in step S330, and injector 15 is controlled to stop fuel injection in step S340. Therefore, engine 10 is stopped. Step S330 and step S340 need not be performed in that order; that is, in a further example embodiment, after the fuel injection is stopped in step S340, engine 10 is then disconnected from the transmission 90 in step S330.

Controller 100 next determines whether an idling condition is satisfied in step S345. The idling condition is satisfied when the temperature of the catalyst in catalytic converter 40 is higher than or equal to a second predetermined temperature. The second predetermined temperature relates to the activation temperature of catalyst in catalytic converter 40 and may be the same as or different from the first predetermined temperature. If engine 10 is stopped, the residual gas or the exhaust gas is forcibly supplied to and purified in catalytic converter 40 only when catalyst in catalytic converter 40 is activated.

If the idling condition is not satisfied in step S345, controller 100 stops the method of stabilizing combustion.

If the idling condition is satisfied in step S345, controller 100 rotates the engine for a predetermined numbers of rotations or for a predetermined time in step S350, and then stops the method of stabilizing combustion. Step S345 may be executed between step S320 and step S330.

In addition, if the engine stop condition is satisfied in step S320, the method proceeds to step S350 after executing step S330 and step S340, i.e. the residual gas or the exhaust gas is discharged after stopping engine 10.

While this invention has been described in connection with practical example embodiments, it is to be understood that the invention is not limited to the disclosed embodiments, but, on the contrary, is intended to cover various modifications and equivalent arrangements included within the spirit and scope of the appended claims.

What is claimed is:

1. A system of stabilizing combustion comprising:
    an engine having a combustion chamber, an intake manifold and an exhaust manifold;
    an injector supplying fuel into the intake manifold or the combustion chamber;
    a starter connected to the engine and rotating the engine with or without the fuel being supplied;
    an intake duct connected to the intake manifold and supplying air to the intake manifold;
    an exhaust pipe connected to the exhaust manifold and discharging an exhaust gas to an exterior of the engine;
    a recirculation pipe fluidly communicating the exhaust pipe with the intake manifold or the intake duct and recirculating a portion of the exhaust gas to the intake manifold or the intake duct;
    an exhaust gas recirculation module controlling the amount of the exhaust gas recirculated to the intake manifold or the intake duct; and
    a controller monitoring a vehicle operation state and controlling operation of the starter and the injector,
    wherein the controller controls the starter to rotate the engine without fuel injection before starting the engine after an engine starting condition is satisfied or after an engine stop condition is satisfied and the engine is stopped.

2. The system of claim 1, wherein the starter controls the number of rotations of the engine or the rotation speed of the engine without fuel injection.

3. The system of claim 2, further comprising a throttle mounted in the intake duct, in the intake manifold, or between the intake manifold and the intake duct, wherein the throttle controls the amount of the air supplied to the intake manifold is, and
    wherein the number of rotations of the engine or the rotation speed of the engine without fuel injection is determined according to an opening of the throttle, or a shape of the intake duct or the intake manifold.

4. The system of claim 1, further comprising a selective connecting device disposed between the engine and the transmission or in the transmission that selectively connects the engine to the transmission, and wherein the vehicle is a hybrid electric vehicle using the engine and a drive motor as power sources and the power of the engine or power of the drive motor is output through a transmission.

5. The system of claim 4, wherein rotation of the engine without fuel injection is performed when the engine is disconnected from the transmission by the selective connecting device.

6. The system of claim 1, wherein the controller further determines whether an idling condition is satisfied if the engine starting condition is satisfied, and rotates the engine without fuel injection if the idling condition is satisfied.

7. The system of claim 6, further comprising a catalytic converter containing a catalyst mounted on the exhaust pipe for purifying the exhaust gas, and
    wherein the idling condition is satisfied when temperature of the catalyst is lower than or equal to a first predetermined temperature.

8. The system of claim 1, wherein the controller further determines whether an idling condition is satisfied if the engine stop condition is satisfied, and rotates the engine without fuel injection if the idling condition is satisfied.

9. The system of claim 8, wherein a catalytic converter containing a catalyst for purifying the exhaust gas is mounted on the exhaust pipe, and
    wherein the idling condition is satisfied when temperature of the catalyst in the catalytic converter is higher than or equal to a second predetermined temperature.

10. A method of stabilizing combustion in a hybrid electric vehicle, the hybrid electric vehicle using a drive motor and an engine as power sources and comprising an injector supplying fuel into the engine, a starter rotating the engine with or without the fuel being supplied by the injector, and an exhaust gas recirculation module recirculating a portion of an exhaust gas generated in the engine back into the engine, the method comprising:
    monitoring a vehicle operation state;
    determining whether an engine starting condition is satisfied; and
    having the controller cause the starter to rotate the engine without fuel injection for a predetermined number of rotations or for a predetermined time if the engine starting condition is satisfied.

11. The method of claim 10, further comprising starting the engine by rotating the engine with fuel injection after rotating the engine without fuel injection for the predetermined number of rotations or for the predetermined time.

12. The method of claim 11, wherein the hybrid electric vehicle further comprises a transmission outputting the power of the drive motor or power of the engine with or without power conversion, and a selective connecting device selectively connecting the engine with the transmission, and
    wherein the method further comprises connecting the engine with the transmission by the selective connecting device after starting the engine.

13. The method of claim 10, further comprising determining whether an idling condition is satisfied if the engine starting condition is satisfied, and
    wherein, if the idling condition is satisfied, having the controller cause the starter to rotate the engine without fuel injection for the predetermined number of rotations or for the predetermined time.

14. The method of claim 13, wherein the hybrid electric vehicle further comprises a catalytic converter containing a catalyst that purifies the exhaust gas generated in the engine, and
    wherein the idling condition is satisfied when temperature of the catalyst in the catalytic converter is lower than or equal to a first predetermined temperature.

15. A method of stabilizing combustion in a hybrid electric vehicle, the hybrid electric vehicle using a drive motor and an engine as power sources and comprising an injector supplying fuel into the engine, a starter rotating the engine with or without the fuel being supplied by the injector, an exhaust gas recirculation module recirculating a portion of an exhaust gas generated in the engine back into the engine, a transmission outputting power of the drive motor or power of the engine with or without power conversion, and a selective connecting device selectively connecting the engine with the transmission, the method comprising:

monitoring a vehicle operation state when the vehicle runs with the power of the engine or with both of the power of the engine and the power of the motor;

determining whether an engine stop condition is satisfied;

having the controller cause the selective connecting device to disconnect the transmission from the engine and stop fuel injection if the engine stop condition is satisfied; and having the controller cause the starter to rotate the engine for a predetermined number of rotations or for a predetermined time.

16. The method of claim 15, further comprising determining whether an idling condition is satisfied if the engine stop condition is satisfied, and wherein, if the idling condition is satisfied, having the controller cause the starter to rotate the engine for the predetermined number of rotations or for the predetermined time.

17. The method of claim 16, wherein the hybrid electric vehicle further comprises a catalytic converter containing a catalyst that purifies the exhaust gas generated in the engine, and wherein the idling condition is satisfied when temperature of the catalyst is higher than or equal to a second predetermined temperature.

\* \* \* \* \*